United States Patent
Dopilka et al.

(10) Patent No.: US 9,720,233 B2
(45) Date of Patent: Aug. 1, 2017

(54) COMPACT PROXIMITY DISPLAY UTILIZING IMAGE TRANSFER

(71) Applicant: HONEYWELL INTERNATIONAL INC., Morristown, NJ (US)

(72) Inventors: David J. Dopilka, Glendale, AZ (US); Mitch Fletcher, Glendale, AZ (US); Daryl Schuck, Seabrook, TX (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 69 days.

(21) Appl. No.: 14/535,968

(22) Filed: Nov. 7, 2014

(65) Prior Publication Data

US 2016/0131906 A1    May 12, 2016

(51) Int. Cl.
*G02B 27/01* (2006.01)
*G02B 6/06* (2006.01)

(52) U.S. Cl.
CPC .......... *G02B 27/0172* (2013.01); *G02B 6/06* (2013.01); *G02B 27/017* (2013.01)

(58) Field of Classification Search
None
See application file for complete search history.

(56) References Cited

U.S. PATENT DOCUMENTS

| | | | |
|---|---|---|---|
| 3,833,300 A | 9/1974 | Rymes | |
| 4,153,913 A | 5/1979 | Swift | |
| 4,269,476 A | 5/1981 | Gauthier et al. | |
| 4,439,755 A | 3/1984 | LaRussa | |
| 4,743,200 A | 5/1988 | Welch et al. | |
| 4,761,056 A | 8/1988 | Evans et al. | |
| 4,878,046 A * | 10/1989 | Smith | G02B 27/017 340/980 |
| 4,897,715 A | 1/1990 | Beamon, III | |
| 5,113,177 A | 5/1992 | Cohen | |
| 5,281,960 A | 1/1994 | Dwyer, III | |
| 5,301,668 A | 4/1994 | Hales | |
| 5,309,169 A | 5/1994 | Lippert | |
| 5,319,490 A | 6/1994 | Ansley | |
| 5,320,534 A | 6/1994 | Thomas | |
| 5,348,477 A | 9/1994 | Welch et al. | |
| 5,416,876 A | 5/1995 | Ansley et al. | |
| 5,420,828 A | 5/1995 | Geiger | |

(Continued)

FOREIGN PATENT DOCUMENTS

| | | |
|---|---|---|
| GB | 1167617 A | 10/1969 |
| WO | 2014033391 A1 | 3/2014 |

OTHER PUBLICATIONS

Cozmicray; NASASpaceFlight.com Forum, General Discussion, Gauges/HUD in astronaut suit? Jul. 26, 2007.
Sofge, E.; Popular Science, The Deep-Space Suit; Nov. 19, 2012.

*Primary Examiner* — Seokyun Moon
(74) *Attorney, Agent, or Firm* — Lorenz & Kopf, LLP

(57) ABSTRACT

A compact proximity display system and method that employs an image transfer device is provided. The system and method employs an image transfer device, such as a fiber optic device, which enables remotely locating an image generating source from the display assembly that is mounted on, or proximate to, the helmet bubble, thereby reducing the amount of components located proximate to the helmet bubble. The system and method minimize the intrusion of the entire display system into user's viewing area, and increase safety.

13 Claims, 5 Drawing Sheets

(56) References Cited

U.S. PATENT DOCUMENTS

| | | | |
|---|---|---|---|
| 5,572,229 A | 11/1996 | Fisher | |
| 5,646,784 A | 7/1997 | Wilson | |
| 5,886,822 A | 3/1999 | Spitzer | |
| 6,369,779 B1 | 4/2002 | Bartlett | |
| 2002/0101568 A1* | 8/2002 | Eberl | G02B 27/017 351/211 |
| 2010/0149073 A1* | 6/2010 | Chaum | G02B 27/0093 345/8 |
| 2013/0249776 A1* | 9/2013 | Olsson | G06F 1/163 345/8 |

* cited by examiner

COMPACT PROXIMITY DISPLAY UTILIZING IMAGE TRANSFER

TECHNICAL FIELD

Embodiments of the subject matter described herein relate generally to helmet mounted display systems and, more particularly, to a compact proximity display utilizing an image transfer feature.

BACKGROUND

Helmet-mounted display systems typically include an image generating source and a display assembly, aligned and oriented within a housing secured to the helmet. There are a variety of helmet-mounted display systems currently in use. A proximity display system is a helmet-mounted display system in which the helmet is not secured to the head in a way that enables the associated display device to maintain a fixed location with respect to the user's eye as the user's head moves around.

Proximity display systems are typically used on protective suits in which the helmets provide a protective structure (referred to as a helmet bubble) around the head and neck of the user; the helmet bubble may maintain a pressurized atmosphere within the helmet. Examples of protective suits include space suits, deep sea diving suits, and protective gear used in environmental disposal situations. A proximity display system is generally affixed to the helmet bubble, and is typically responsible for producing a virtual image, referred to herein as the "display" or "image," that provides information and/or enables the user with a variety of applications.

Because protective suits are typically used in situations requiring acute awareness and rapid responses, a helmet-mounted display on a protective suit should not unduly interfere with visibility of the outside world, or distract the user from activities occurring in the outside viewing area. Therefore, minimizing the intrusion of a helmet-mounted display system into the user's viewing area may improve safety and situational awareness.

It would therefore be desirable to provide a compact proximity display system and method that employs an image transfer feature, such as a fiber optic device, which enables remotely locating an image generating source from a display assembly that is mounted on, or proximate to, the helmet bubble, thereby reducing the amount of components located proximate to the helmet bubble. The desired system and method minimize the intrusion of the entire display system into user's viewing area, and increase safety.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A display system for a helmet is provided. The display system comprises an image transfer device configured to receive an image at a first location that is remote from the helmet and provide the image at a second location that is proximate to the helmet. The display system also comprises a display assembly coupled proximately to the helmet and coupled to the image transfer device, the display assembly is configured to receive the image at the second location and display the image in focus when viewed from a predetermined eyebox.

A method for displaying an image at a predetermined location relative to a helmet is provided. The method comprises transferring an image from a first location remote from the helmet to a second location that is proximate to the helmet and displaying, from the second location, the image in focus when viewed from a predetermined eyebox within the helmet.

A display system for a helmet with a predetermined eyebox is also provided. The system comprises an image source for generating an image at a first location remote from the helmet, an image transfer device coupled to the image source and configured to receive the image at the first location and provide the image at a second location proximate to the helmet, and a display assembly coupled to the image transfer device and coupled proximately to the helmet, and configured to receive the image at the second location and display the image in focus when viewed from the predetermined eyebox.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

Figure 1:
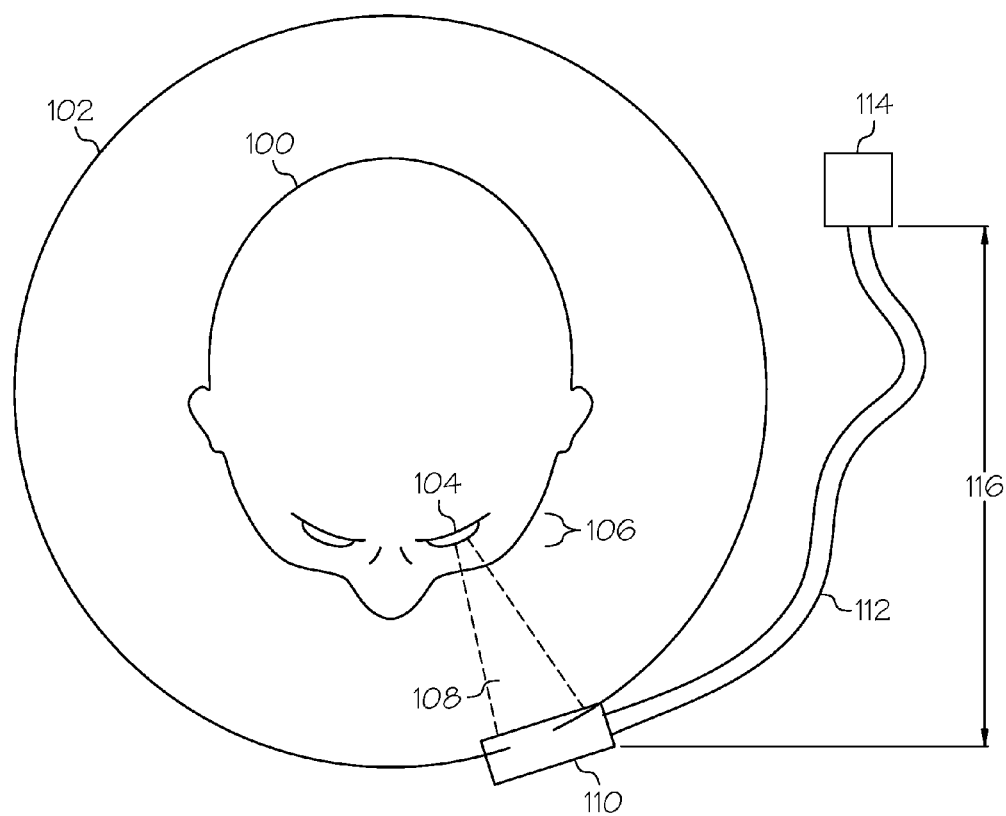
FIG. 1 is a simplified top down illustration of a user's head inside a helmet according to an exemplary embodiment.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to known graphics and image processing, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices. Such operations, tasks, and functions are sometimes referred to as being processor-executed, computer-executed, computerized, software-implemented, or computer-implemented. In practice, one or more processor devices can carry out the described operations, tasks, and functions by manipulating electrical signals representing data bits at memory locations in the processor electronics of the display system, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, and consistent with the helmet discussion hereinabove, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiments described herein are merely examples and serve as guides for implementing the novel systems and methods herein on any display system for a helmet in any terrestrial, water, hazardous atmospheres, avionics or astronautics application. It is readily appreciated that the relevant helmets are designed to meet a plurality of environmental and safety standards beyond the scope of the examples presented below. As such, the examples presented herein are intended as non-limiting.

FIG. 1 is a simplified top down illustration of a user's head 100 inside the helmet bubble of helmet 102 according to an exemplary embodiment. FIG. 1 is not to scale, but provides an example of the relative placement of features; additionally, although helmet 102 may comprise multiple layers and various shapes, the embodiment depicts helmet 102 as a circular barrier ("helmet bubble") around the user's head 100 that may be employed to protect a pressurized oxygen-rich atmosphere provided for the user.

The display assembly 110 is depicted coupled proximately (e.g., very close or very near) to the helmet 102, and employs a first display device (the first display device has a plurality of embodiments, examples are described in more detail in connection with FIGS. 3, 4, and 5). An image transfer device 112 receives an image from an image source 114 at a first location, remote from the helmet (e.g., a predetermined distance 116, such as several inches to several feet apart from the helmet); the image source 114 may be separately housed/contained and may be secured to another portion of a protective suit or another support surface. The image transfer device 112 presents the image at the display assembly 110, which is located at a second location, proximate to the helmet 102. Advantageously, the image source 114 may be located substantially remote from the helmet 102; e.g., at a predetermined distance 116 from the display assembly 110.

When helmet 102 is in place surrounding the user's head 100, the user's eye 104 may be readily moved into the helmet's predetermined eye box 106. From the predetermined eyebox 106, the user's eye 104 has an associated field-of-view 108. While depicted in two dimensions, the user's field-of-view 108 is a three dimensional volume. The predetermined eyebox 106 is depicted in one dimension for simplifying purposes, but in actuality is a volume that may be a rectangle, sphere, or any volume for which the display system is designed to optimally generate focused images. The proposed predetermined eyebox is also described in U.S. patent application Ser. No. 14/519,572 filed Oct. 21, 2014, entitled "SYSTEM AND METHOD FOR CONTROLLING VISIBILITY OF A PROXIMITY DISPLAY," and assigned to the instant assignee, the teachings of which are hereby incorporated by reference.

When the user's eye is located within the predetermined eyebox 106, the user's gaze lands on a first display device (for example projection coating 302 in FIG. 3), positioned and configured to create, from the perspective of the user's eye, a "virtual image" that appears to be focused at a predetermined virtual image distance. The virtual image is a focused representation of the image generated at the remote location by the image source 114. The predetermined virtual image distance may meet any design criteria, and is generally selected to minimize eye strain or adjustment on the part of the user. In some embodiments, the predetermined virtual image distance appears to be from anywhere between about five feet away from the user and infinity.

Figure 2:
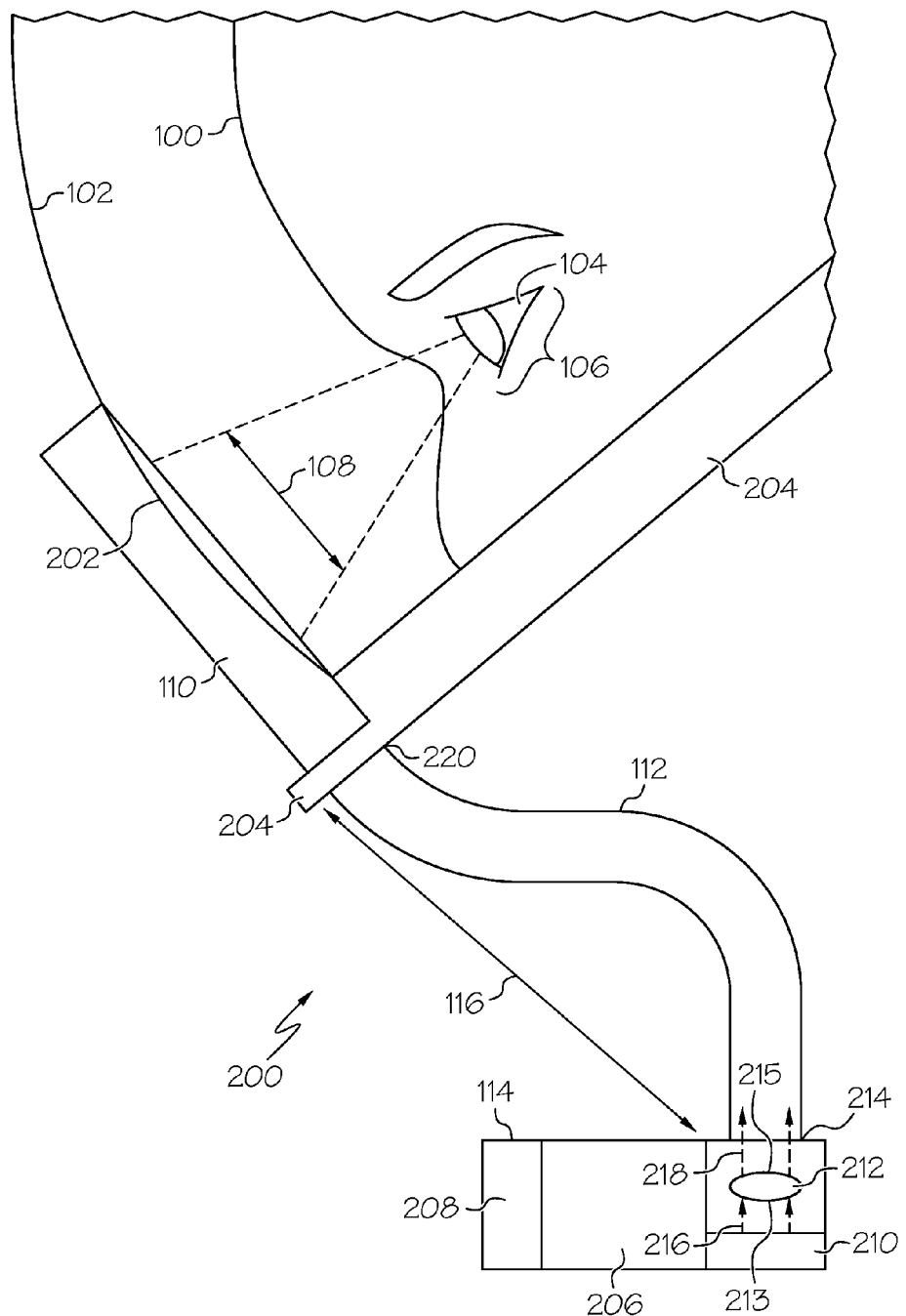
FIG. 2 is a side view illustration of the display system for a helmet depicted in FIG. 1, in accordance with the exemplary embodiment.

FIG. 2 is a side view illustration of the display system for a helmet depicted in FIG. 1, in accordance with the exemplary embodiment. FIG. 2 is not to scale, but provides an example of the relative placement of features. As with FIG. 1, the user's head 100 is within the helmet bubble of helmet 102, and the user's eye 104 is located within the predetermined eyebox 106. An area on the helmet bubble that is used for viewing a display with the field-of-view 108 is identified as area 202. The display assembly 110 is coupled via a support structure 204 to the helmet 102. Image transfer device 112 transfers the image from the remotely located image source 114 (located at a first location that is a predetermined distance 116 from display assembly 110) to the display assembly 110, advantageously enabling the use of an image source 114 that is situated at a substantially remote location from helmet 102. The image transfer device 112 is coupled at a first location 214 to the image source 114, and at a second location 220 to the display assembly 110 proximate to the helmet 102.

Support structure 204 may serve as a housing for features of the display assembly 110, providing the structural support and/or protection that features of the display assembly 110 may require. Support structure 204 may be of any shape or volume, material, transparency or orientation that is suitable to meet the environmental and design requirements of the display system 200.

Figure 3:
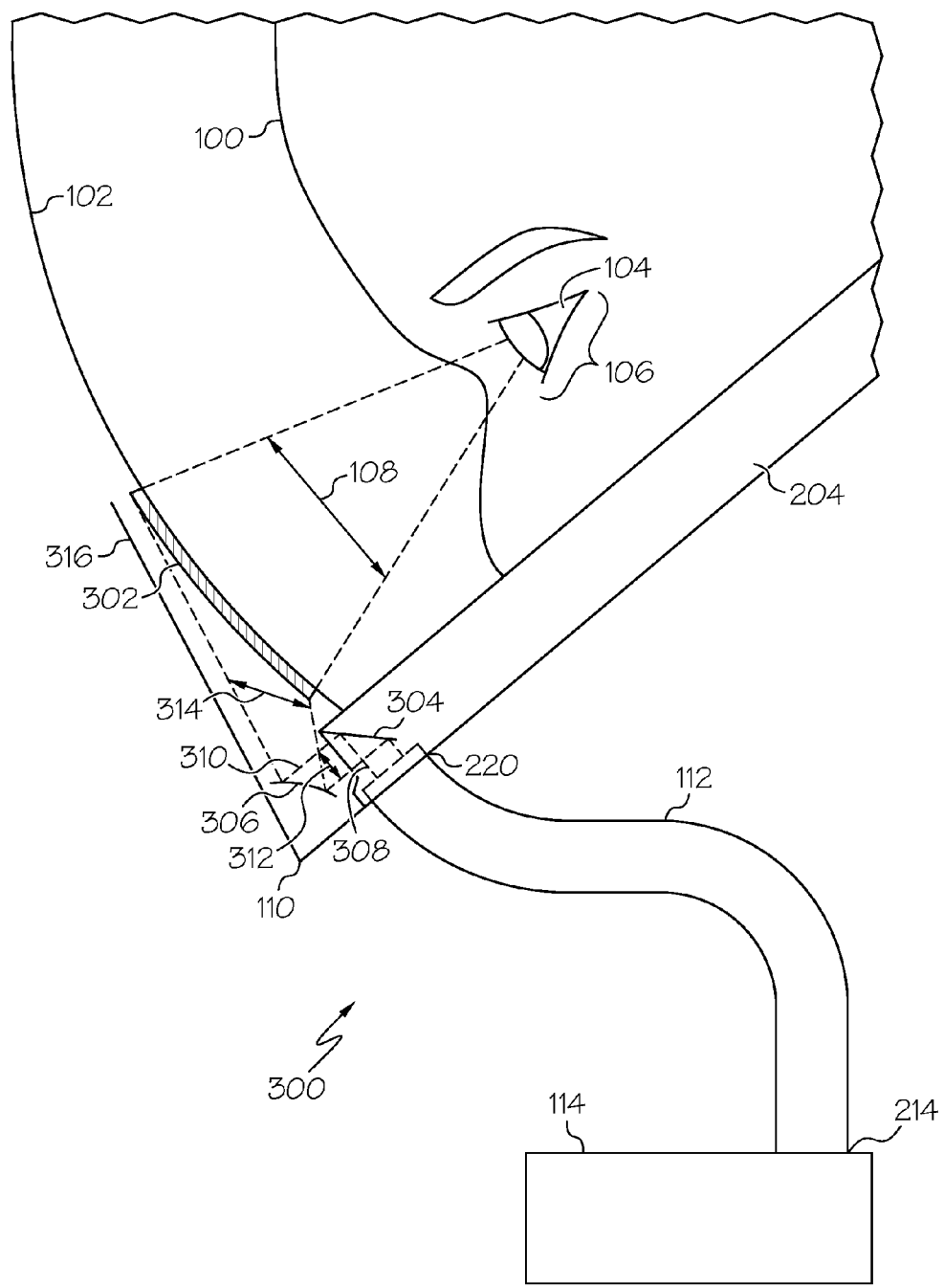
FIG. 3 is a simplified side view illustration of an display system having a projection coating in the display assembly, in accordance with an exemplary embodiment.
Figure 4:
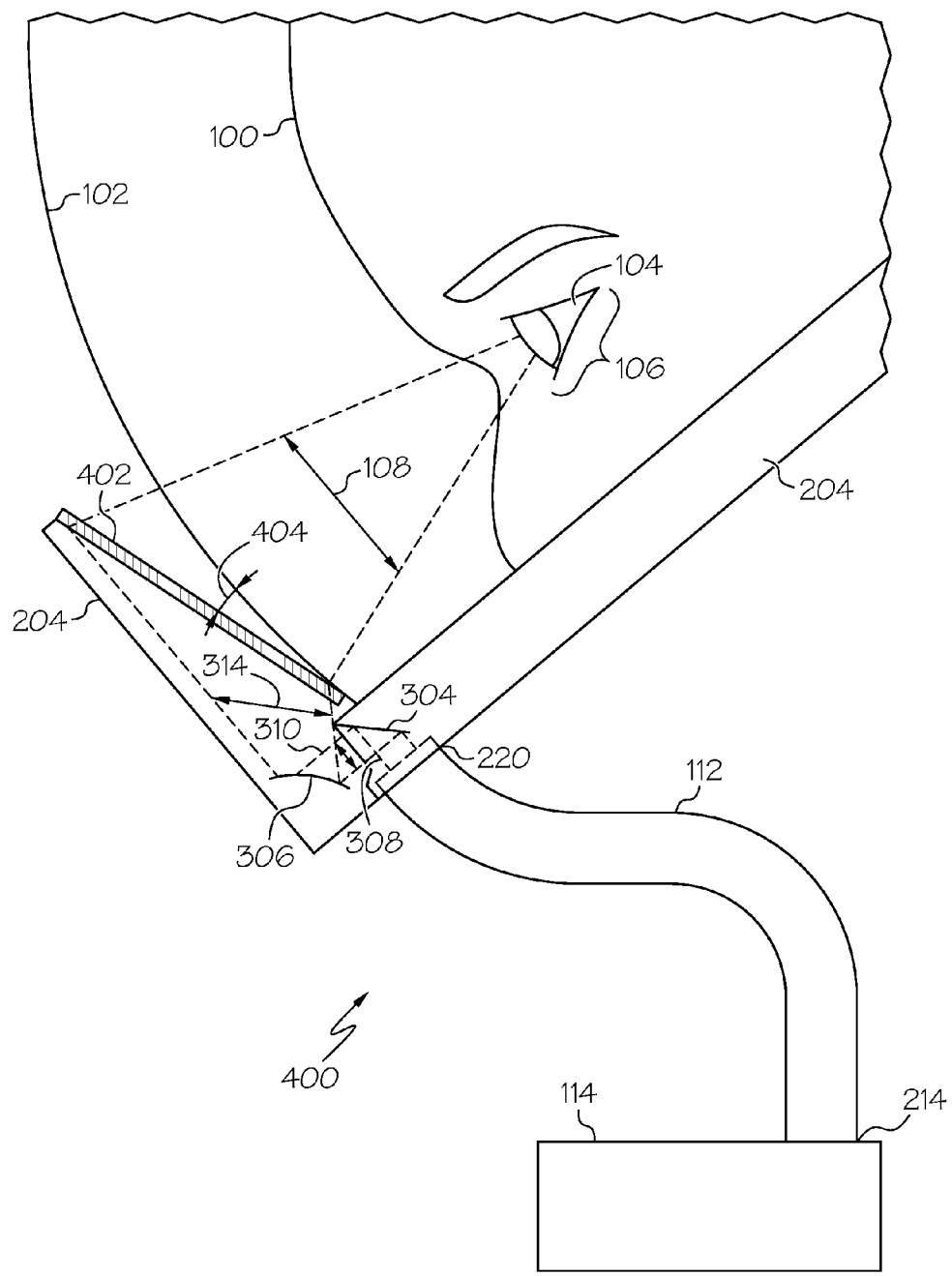
FIG. 4 is a simplified side view illustration of an display system having a rear projection screen in the display assembly, in accordance with another exemplary embodiment.
Figure 5:
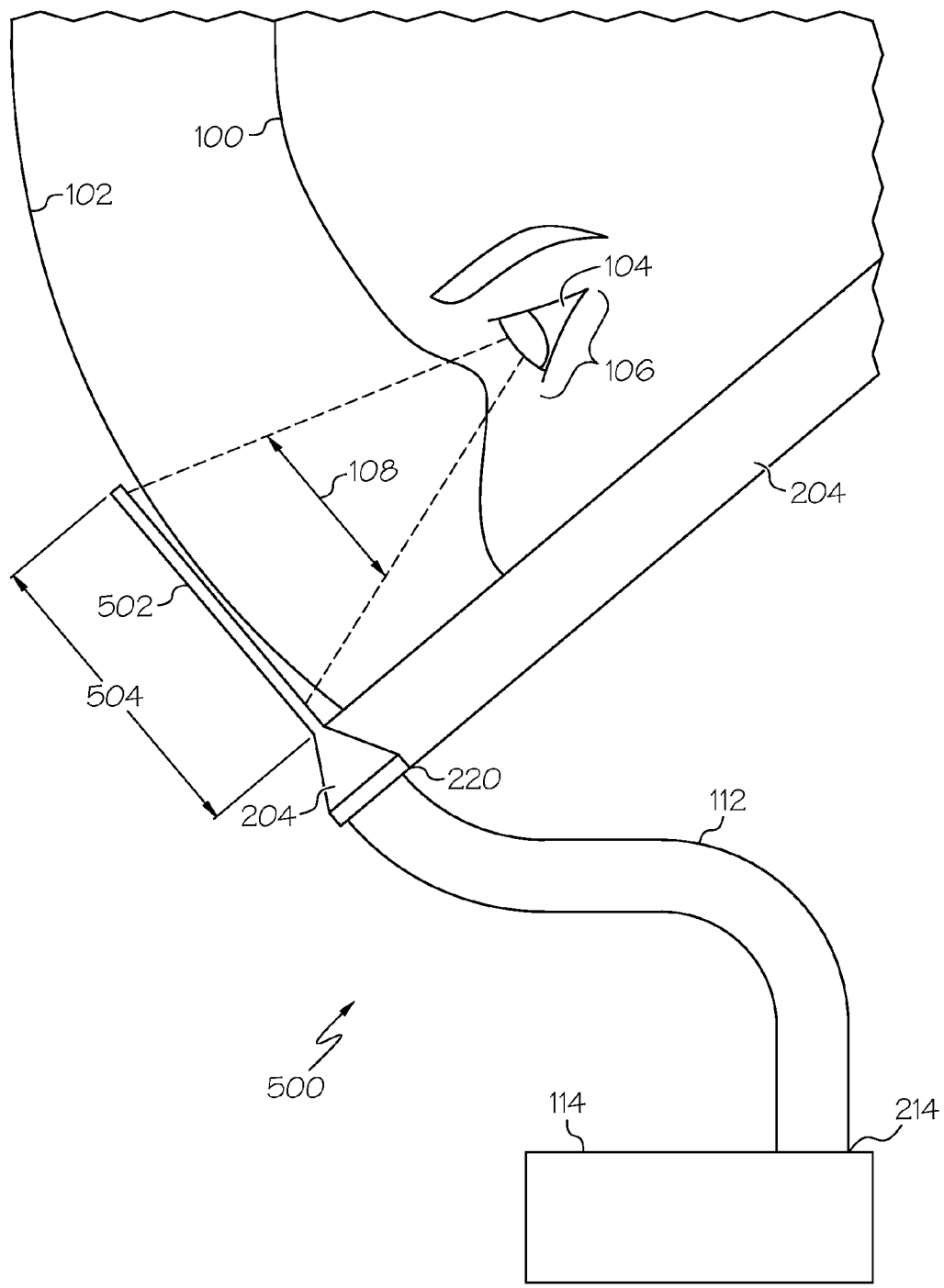
FIG. 5 is a simplified side view illustration of a display system having an optical waveguide in the display assembly, in accordance with yet another exemplary embodiment.

In practice, one or more display systems 200 may be placed on the helmet, and for each display system 200, the individual components may be placed at any location on the helmet, and with or without support structure 204; specifically, the first display device (referred to as display element 302, 402, 502 in connection with FIGS. 3, 4 and 5) may be inside the helmet in direct contact with the helmet bubble, inside the helmet but not in direct contact with the helmet bubble, integrated into the helmet bubble, or outside the helmet, directly or indirectly coupled to the helmet bubble. In addition, display system 200 may be designed to operate with the right or left eye individually or placed centrally so that either eye may comfortably view the image. In another embodiment, a separate display may be positioned in front of each eye in order to display different information on each of the two displays, or in order to use the two displays to present stereoscopic imagery to the user.

Image source 114 may comprise a processor 206, memory 208, a second display device 210, and at least one lens 212. Lens 212 is oriented to direct an image generated by the second display device 210 toward a first location 214 of the image transfer device 112. Lens 212 may be a collimating lens, which is typically employed to receive image light rays on an input surface and produce parallel or substantially parallel light rays at an output surface. As depicted in FIG. 2, an input surface 213 of the lens 212 faces the second display device 210, having unobscured access to images generated by the second display device 210, and creates a sharpened or clarified image at its output surface 215. While the lens 212 is depicted in FIG. 2 as a single lens, it may include a plurality of lens elements of various types, sizes, and shapes. Additionally, lens 212 may be adjusted in prescription, position, etc to accommodate unique vision characteristics of a user.

The processor 206 may be implemented or realized with at least one general purpose processor device, a graphics processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor 206 is configured to drive the display functions of the second display device 210, and is typically in communication with various electronic systems included in a protective suit associated with the helmet 102.

The processor 206 may include or cooperate with an appropriate amount of memory 208 which can be realized as RAM memory, flash memory, EPROM memory, EEPROM memory, registers, a hard disk, a removable disk, a CD-ROM, or any other form of storage medium known in the art. In this regard, the memory 208 can be coupled to the processor 206 such that the processor 206 can read information from, and write information to, memory 208. In the alternative, memory 208 may be integral to the processor 206. In practice, a functional or logical module/component of the system described here might be realized using program code that is maintained in memory 208. Moreover, memory 208 can be used to store data utilized to support the operation of the system, as will become apparent from the following description.

No matter how the processor 206 is specifically implemented, it is in operable communication with second display device 210. Processor 206 is configured, in response to inputs from various sources of navigational, procedural, graphical and video data as well as space suit status sensors and environmental sensors (sensing, for example, suit pressure, temperature, voltage, current, and the like), to selectively retrieve and process data from the one or more sources and to generate associated display commands. In response, second display device 210 selectively renders various types of textual, graphic, and/or iconic information that may be two or three dimensional, and may include three dimensional moving images. Hereinafter, the various textual, graphic, and/or iconic data generated by the display device may be referred to herein as the "image."

It will be appreciated that the second display device 210 may be implemented using any one of numerous known display devices or micro display devices suitable for rendering textual, graphic, and/or iconic information in a format viewable by the user. Non-limiting examples of such display devices include various light engine displays, organic electroluminescent display (OLED), and flat screen displays such as LCD (liquid crystal display) and TFT (thin film transistor) displays. The second display device 210 may additionally be secured or coupled to a protective suit (not shown) by any one of numerous known technologies.

Image transfer device 112 may comprise a fiber optic bundle, or any similar image transferring material or device. Examples of image transfer device 112 include 1) lens(es) and mirror(s) configured to transfer the image across a predetermined distance (not necessarily in a straight line), 2) optical wave guides, and 3) electronic image transfer devices, such as a camera that converts an image into digital data coupled to a conductive element to transfer the digital data.

FIG. 3 is a simplified side view illustration of a display system 300 having a projection coating 302 for the display device, in accordance with an exemplary embodiment. FIG. 3 is not to scale, but is useful to comprehend the relative placement of features of these embodiments. As with FIG. 2, the user's head 100 is within the helmet 102, and the user's eye 104 is located within the predetermined eyebox 106. The display assembly 110 is shown coupled with close proximity, via a support structure 204, to helmet 102; support structure 204 may take on any shape, form, and transparency that achieve the design and environmental requirements. The image transfer device 112 is also shown. The image transfer device 112 is coupled at a first location 214 to the image source 114, and the image transfer device 112 is coupled at a second location 220 to the display assembly 110.

FIG. 3 comprises a first mirror 304 and a second mirror 306. First mirror 304 and a second mirror 306 are oriented to redirect the image that is presented at the second location 220 of the image transfer device 112. First mirror 304 may be any type of mirror, prism, optical combiner, or the like, that redirects the image presented by the image transfer device 112. In FIG. 3 the first mirror 304 is depicted as a flat mirror, redirecting the image rays at a substantially ninety degree angle (see, image ray 308 and image ray 310); however various angles are supported by the embodiment. The second mirror 306 may also be any type of mirror, prism, optical combiner, or the like, that redirects the image from the first mirror 304. FIG. 3 depicts the second mirror 306 as a curved mirror, which causes the reflected/exiting image light rays to spread out, as can be seen by comparing the incident rays width 312 of the to the reflected rays width 314.

In FIG. 3 the projection coating 302 coupled to the helmet 102 serves as the first display device. The projection coating 302 is shown in cross section, but it is readily appreciated that it comprises an area sufficient to cover the viewing area supported by a three dimensional field-of-view 108. The reflected image light rays impinge on the projection coating 302. The first and second mirror are specifically sized and oriented to distribute the image light rays on the area of projection coating 302 that has been selected to support the field-of-view 108. The display assembly 110 may include a display shade 316, sized according to the area of the projection coating 302. Alternatively, if display shade 316 is not present, the display may be "see-through" (i.e., the formed image appears overlaid on the outside world view).

FIG. 4 is a simplified side view illustration of a display system 400 having a rear projection screen for the display device, in accordance with another exemplary embodiment. FIG. 4 is not to scale, but is useful to comprehend the relative placement of features of these embodiments. Elements in common with FIG. 3 are not described again. In FIG. 4 the image light rays comprising reflected rays width 314 impinging on rear projection screen 402, which is essentially a flat version of the projection coating 302 in FIG. 3. Projection screen 402 is depicted positioned at a variable angle, angle 404, to the line of sight. The exemplary embodiment supports a plurality of angles between the projection screen and the line of sight. When angle 404 is equal to zero, the projection screen is perpendicular to the line of sight. The support structure 204 provides support and orientation for rear projection screen 402, which is sized and oriented to display the image in focus for the eye when the eye is in the predetermined eyebox 106.

FIG. 5 is a simplified side view illustration of a display system 500 in which the first display device is an optical waveguide, in accordance with yet another exemplary embodiment. FIG. 5 is not to scale, but is useful to comprehend the relative placement of features of this embodiment. The optical waveguide 502 extends to a height 504. As with the other devices serving as the first display device in the exemplary embodiments described herein, the optical waveguide is selected to have a height, weight and thickness to meet the environmental and design requirements and also to display the image in focus for the field of view, from the perspective of the eye when in the predetermined eyebox 106.

Within the display system of each embodiment, the processor module continuously monitors environmental and safety data, suit pressure sensors, temperature sensors, voltage sensors, current sensors and the like. In response to the various inputs, the processor generates appropriate commands for the second display device to generate various textual, graphic, and/or iconic data referred to hereinabove as "the image;" the image is subsequently transferred, reflected and displayed in focus for the user as described.

Thus, there has been provided a compact helmet-mounted display system and method that minimizes intrusions into the user's viewing area. The system and method employs an image transfer device, such as a fiber optic device, which enables remotely locating an image generating source from the display assembly that is mounted on, or proximate to, the helmet bubble, thereby reducing the amount of components located proximate to the helmet bubble. The system and method minimize the intrusion of the entire display system into user's viewing area, and increase safety.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A display system for a helmet, the display system comprising:
   an image transfer device configured to receive an image at a first location that is remote from the helmet and provide the image at a second location that is proximate to the helmet;
   a display assembly configured to receive the image at the second location and redirect the image in focus at a configurable predetermined virtual image distance when viewed from a predetermined eyebox, the display assembly comprising:
      a first display device coupled proximately to the helmet and to the image transfer device;
      a first mirror (304); and
      a second mirror (306); and
      wherein the first mirror is configured to receive the image from the image transfer device at the second location and redirect the image as image light rays to the second mirror, the second mirror (i) configured to directly receive the image light rays from the first mirror and cause exiting image light rays to spread out, and (ii) direct the exiting light rays to the first display device; and
   an image source comprising a second display device for generating the image, wherein the second display device is a micro display device.

2. The display system of claim 1, wherein the image transfer device is a fiber optic bundle.

3. The display system of claim 1, wherein the first display device comprises a rear projection screen.

4. The display system of claim 3, wherein the first mirror is flat.

5. The display system of claim 4, wherein the second mirror is curved.

6. The display system of claim 1, wherein the helmet comprises a helmet bubble and wherein the first display device comprises a projection coating coupled to a predetermined area on the helmet bubble.

7. The display system of claim 1, wherein the image source further comprises:
   a processor coupled to the second display device and configured to command the second display device to generate the image; and
   a lens oriented to (i) clarify the image and (ii) direct the clarified image to the image transfer device at the first location.

8. The display system of claim 7, wherein the lens comprises a collimating lens, configured to receive image light rays on an input surface and produce substantially parallel light rays at an output surface.

9. The display system of claim 1, wherein the image comprises a three dimensional, moving image.

10. A method for displaying an image at a predetermined location relative to a helmet, the method comprising:
  generating an image by an image source comprising a micro display device, the image source at a first location that is remote from the helmet;
  transferring, by an image transfer device, the image from the first location to a second location that is external and proximate to the helmet;
  at the second location:
    receiving the image from the image transfer device at the second location by a first mirror;
    redirecting the received image as image light rays by the first mirror;
    directly receiving the image light rays from the first mirror by a second mirror;
    causing the image light rays to spread out, creating an enlarged image by the second mirror; and
    displaying the enlarged image such that it is in focus at a configurable predetermined virtual image distance when viewed from a predetermined eyebox within the helmet.

11. The display method of claim 10, wherein transferring comprises:
  receiving the image by a fiber optic bundle at the first location; and
  presenting the image at the second location by the fiber optic bundle.

12. The display method of claim 10, further comprising displaying the enlarged image on a rear projection screen.

13. A display system for a helmet, the display system comprising:
  an image transfer device configured to receive an image at a first location that is remote from the helmet and provide the image at a second location that is proximate to the helmet;
  a display assembly configured to receive the image at the second location and redirect the image in focus at a configurable predetermined virtual image distance when viewed from a predetermined eyebox, the display assembly comprising:
    a first display device, comprising a rear projection screen, coupled proximately to the helmet and to the image transfer device;
    a first mirror; and
    a second mirror; and
    wherein the first mirror is configured to receive the image from the image transfer device at the second location and redirect the image as image light rays to the second mirror, the second mirror (i) configured to directly receive the image light rays from the first mirror and cause exiting image light rays to spread out, and (ii) direct the exiting light rays to the first display device; and
  an image source comprising a second display device for generating the image, wherein the second display device is a micro display device.

* * * * *